UNITED STATES PATENT OFFICE.

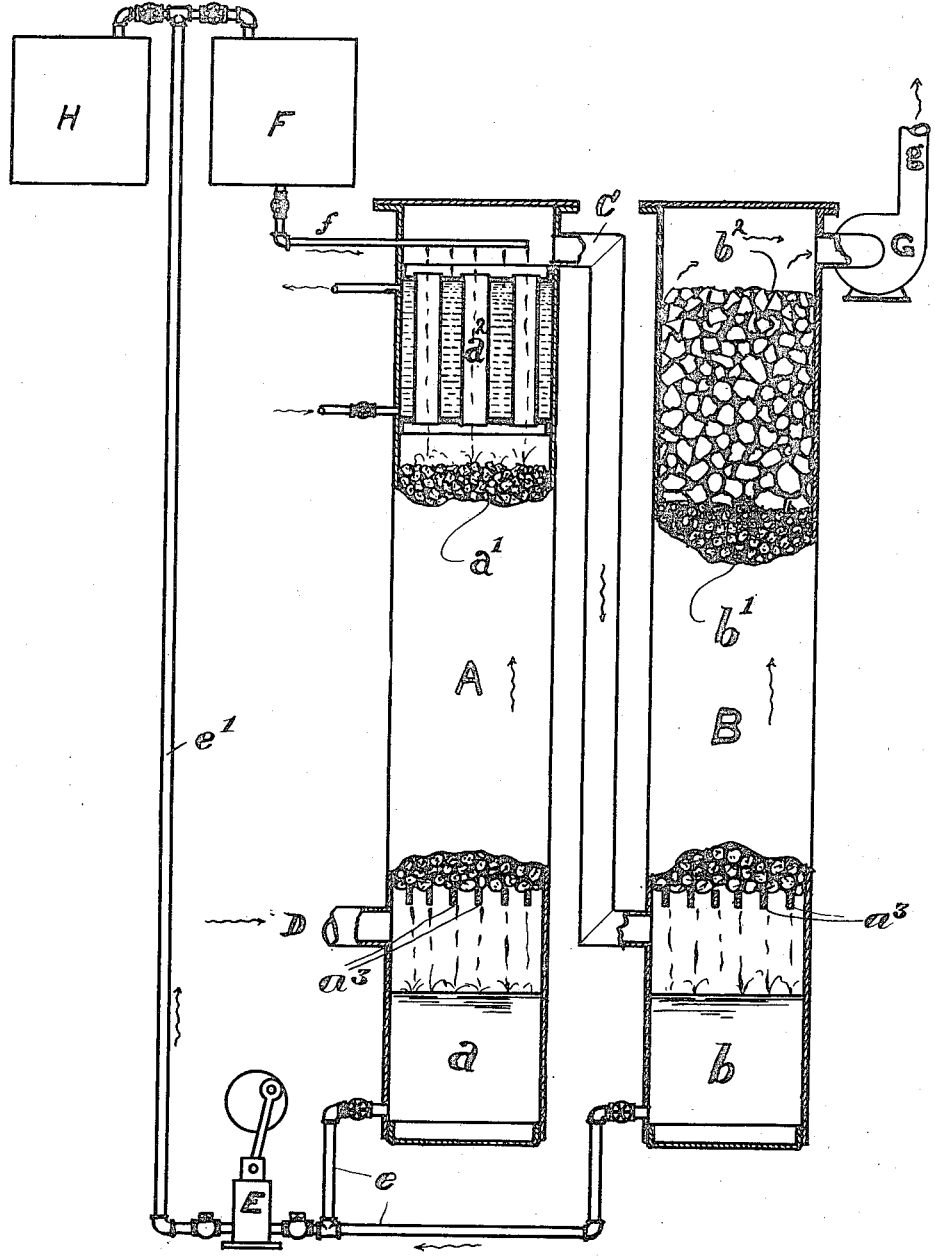

WILLIAM O. QUAYLE, OF WILMINGTON, DELAWARE, ASSIGNOR TO THE MIDLAND CHEMICAL COMPANY, OF MIDLAND, MICHIGAN, A CORPORATION OF MICHIGAN.

METHOD OF MAKING SULFUR CHLORID.

961,530.  Specification of Letters Patent. Patented June 14, 1910.

Application filed September 2, 1909. Serial No. 515,787.

*To all whom it may concern:*

Be it known that I, WILLIAM O. QUAYLE, a citizen of the United States, and a resident of Wilmington, county of Newcastle, State of Delaware, have invented a new and useful Improvement in Methods of Manufacturing Sulfur Chlorid, of which the following is a specification, the principle of the invention being herein explained and the best mode in which I have contemplated applying that principle, so as to distinguish it from other inventions.

The improved process herewith involved relates to the manufacture of sulfur chlorid ($SCl_2$ and $S_2Cl_2$) in general, but for the purpose of illustration such manufacture may be advantageously described as particularly related to the manufacture of carbon tetrachlorid. In such latter manufacture, the dichlorid is employed along with carbon disulfid, the chemical reaction involved being $$2SCl_2 + CS_2 = CCl_4 + 4S.$$

From the resulting solution in such manufacture of carbon tetrachlorid, the latter is distilled off leaving the sulfur resulting as per the above equation in solution in the sulfur monochlorid that is formed by the reaction of such sulfur with the excess of dichlorid employed in the reaction. The actual amount of sulfur thus carried in solution by the monochlorid is variable and for the purpose of this process is quite immaterial. The solution, however, is very readily formed and at ordinary temperatures the chlorid may contain as much as 60 per cent. of sulfur, forming a thick syrupy liquid. It is particularly with treatment of this residual solution of the monochlorid and sulfur to produce more of the dichlorid for use over again in the process just described that the present process is concerned, although as has been stated it obviously is a matter of indifference whether the resulting product be employed in the general manufacturing operation just described or otherwise, or indeed, whether the sulfur be derived from a related process or be otherwise introduced.

The object of this invention is to attain a more economical utilization of the chlorin employed in chlorinating such sulfur and monochlorid and to prevent the escape of the readily volatile dichlorid into the atmosphere, such escape being objectionable not merely because of the loss of the product thereby entailed, but also because of the highly objectionable odor of the compound in question.

To the accomplishment of these and related objects the invention consists of the steps hereinafter fully described and particularly set forth in the claims.

The annexed drawing and the following description set forth in detail one approved method of carrying out the invention, such disclosed mode, however, constituting but one of various ways in which the principle of the invention may be used.

In said annexed drawing:—The single figure there appearing represents a part sectional view, more or less diagrammatic in character, of one approved type of apparatus for carrying out my process.

Having reference to the drawing, A will be seen to represent a reaction tower in the form of a closed, vertical, cylindrical chamber. The lower portion of the tower forms a tank $a$ or storage base and above it is fixed a grating $a^3$ upon which rests a quantity of suitable packing $a^1$ such as coke. The upper portion of the tower is provided with a condenser $a^2$ formed by water jacketed vapor tubes passing through tube sheets. A gas inlet pipe D enters below the grating and above the liquor level in the base, and a vapor outlet pipe C connects the upper portion of the tower above the condenser with a tower B similar to A, with the exception that it has no condenser and is provided with an exhaust fan G which draws gases, etc. from the upper portion of the tower and discharges through pipe $g$. Two storage tanks F and H are placed above, the former of which drains into the tower A by means of the valved pipes, as shown; while a pump E, connected with the towers by valved pipes $e$, is adapted to draw liquor from the bases of said towers and lift it to either tank F or H, as desired, through another valved pipe $e^1$.

In the utilization of the above described apparatus for the manufacture of sulfur chlorids by my improved process, liquid sulfur monochlorid containing sulfur in solution, as before described, is supplied to the tank F and is allowed to run from it by way of the pipe $f$ into the tower A, where it trickles down over the coke or other packing employed, finally dripping into the storage base below. Thence such liquid is drawn and returned by the pump E into the tank F, or if desired it may be diverted into tank H. Simultaneously with the passage of this stream of sulfur chlorid in one direction through the reaction tower A, a gaseous body admitted through the inlet pipe D is drawn upwardly through the tower A, thence through the connecting pipe C and in like manner upwardly through the tower B, being finally discharged by the exhaust fan G through the pipe $g$. Such gaseous body consists of chlorin which should be dry but which may be diluted with air, as is usual in commercial practice. Owing to the heat generated by the reaction in tower A between chlorin and the monochlorid or sulfur, part of the dichlorid formed is volatilized and is carried forward with the unabsorbed air or other inert gases present. It is the office of the condenser $a^2$ to cool, condense and return the larger part of this vapor to the tower packing below it, over which it trickles, and finally drips into the storage base. The uncondensed dichlorid vapor and unabsorbed chlorin passes out of the upper portion of tower A with the inert gases and are drawn upwardly through the second tower B. In order to retain this chlorin and dichlorid, the tower B is charged with a quantity of sulfur $b^2$ in pieces which rest upon the packing $b^1$ and I find that sulfur so disposed absorbs almost completely the residual dichlorid vapor and chlorin which may reach it. The monochlorid formed upon the surface of the sulfur by the action of the dichlorid dissolves some of the sulfur and flows down through the tower packing below, where it meets and further assists in absorbing the escaping vapors and chlorin. When sufficient monochlorid has accumulated in the storage base of B it is pumped by pump E into the tank F. It will be seen, therefore, that by my improved process the greater part of the sulfur used is introduced into the apparatus through pipes in the liquid, dissolved, form without opening the reaction chambers or towers, and that the small amount of solid sulfur required to be charged is introduced at the exhaust end of the system where the presence of vapor and odor is least, and in fact, practically negligible. I secure thereby the most complete utilization of the chlorin and sulfur with the least incidental loss and nuisance, and the control of the process is rendered easier and more simple than in any other process with which I am acquainted.

Other modes of applying the principle of my invention may be employed instead of the one explained, change being made as regards the process herein disclosed, provided the step or steps stated by any one of the following claims or the equivalents of such stated step or steps be employed.

I therefore particularly point out and distinctly claim as my invention:—

1. In the manufacture of sulfur chlorids, the steps which consist in chlorinating sulfur in solution, and absorbing any escaping chlorin or chlorid vapors with solid sulfur.

2. In the manufacture of sulfur dichlorid, the steps which consist in chlorinating sulfur in solution to such dichlorid, and absorbing any escaping chlorin or dichlorid vapors with solid sulfur.

3. In the manufacture of sulfur dichlorid, the steps which consist in chlorinating a solution of sulfur mono-chlorid and sulfur, and absorbing any escaping chlorin or dichlorid vapors with solid sulfur.

4. In the manufacture of sulfur dichlorid, the steps which consist in passing a gaseous body containing chlorin through a solution of sulfur mono-chlorid and sulfur, whereby sulfur dichlorid is produced, and then passing the residual gases, including any unabsorbed chlorin or vaporized dichlorid, over solid sulfur, whereby such chlorin and dichlorid vapors are absorbed.

5. The improvement in the manufacture of sulfur chlorids, which consists in absorbing in solid sulfur any chlorin or chlorid vapors that escape from the principal reactions.

Signed by me this 28th day of August, 1909.

WILLIAM O. QUAYLE.

Attested by—
 OLENA DONALD,
 LIZZIE COCHRAN.